Aug. 27, 1946.    W. H. CHURCHILL    2,406,665
COVERING INSTALLATION AND ATTACHING CLIP THEREFOR
Filed Oct. 28, 1944
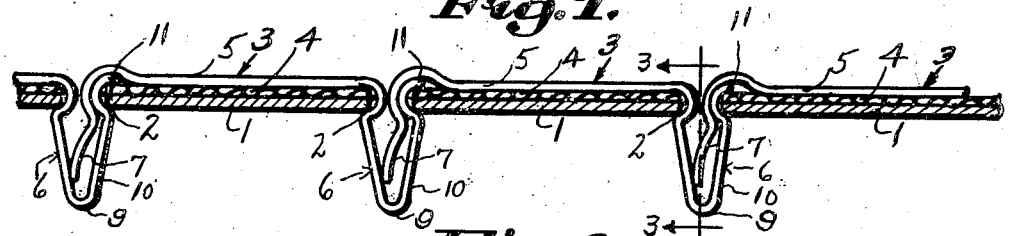
Fig. 1.
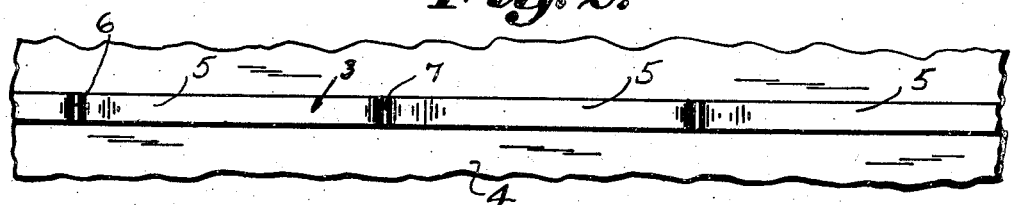
Fig. 2.
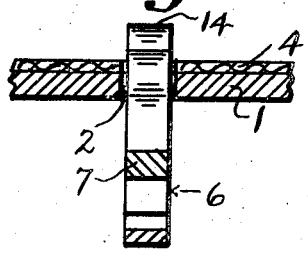
Fig. 3.
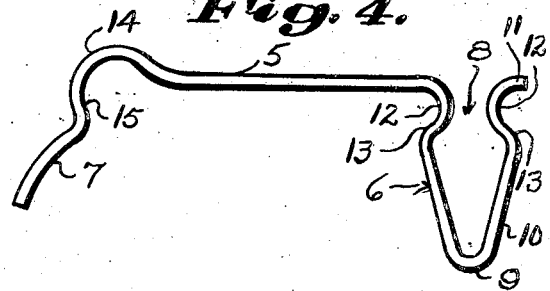
Fig. 4.
Fig. 5.
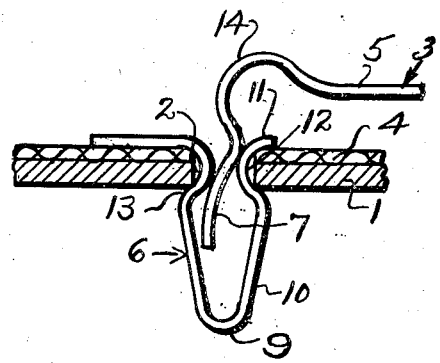
Fig. 6.
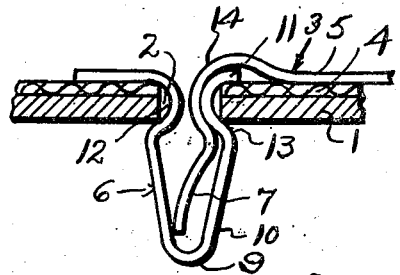
Fig. 7.
Inventor
Wilmer H. Churchill,
By Walter S. Jones
Attorney Patented Aug. 27, 1946

2,406,665

UNITED STATES PATENT OFFICE 2,406,665

COVERING INSTALLATION AND ATTACHING CLIP THEREFOR

Wilmer H. Churchill, Saugus, Mass., assignor to United-Carr Fastener Corporation, Cambridge, Mass., a corporation of Massachusetts Application October 28, 1944, Serial No. 560,879

7 Claims. (Cl. 24—81)

The present invention relates to fabric-secured installations and to attaching clips therefor and aims generally to improve the construction of the installation as well as the provision of a simple novel and efficient clip for use in such installations.

There are many types of installations where it is desired to secure one or more plies of a fabric, either woven or sheet fabric, to a metal or like rigid support. One such installation, selected herein for illustrative purposes, is the application of a covering, such as fabric, to aircraft, motor vehicles and the like wherein a fabric ply or plies are secured to an underlying metal support, by means of metal fastener members. Heretofore such fasteners have been of the type illustrated and described in my prior Patent No. 2,345,325, granted March 28, 1944, and consisted of a plurality of fasteners adapted to penetrate the fabric and lock with the support and at spaced points of application along the support.

One of the primary aims and objects of the present invention is the provision of an improved fabric secured installation in which the fabric is secured to the support by means of a series of fasteners connected together to provide a continuous fastening through a desired length of installation.

A further object of the invention is the provision of an improved fastener clip for fabric-secured installations and the like wherein a portion of one clip is adapted to lock with a fastener portion of an adjacent clip so as to provide a continuous fastening.

The above and other advantages of the invention will be apparent from the accompanying drawing and annexed specification illustrating and describing one preferred embodiment of the invention.

In the drawing:

Fig. 1 is a longitudinal sectional view of a portion of a fabric-secured installation of the invention the section being taken along a side edge of a series of fasteners as indicated by the arrows 2—2 of Fig. 2;

Fig. 2 is a plan view thereof;

Fig. 3 is a transverse sectional view thereof as taken on the line 3—3 of Fig. 1;

Fig. 4 is a side view of an improved attaching clip according to a preferred form of the invention;

Fig. 5 is a plan view thereof;

Fig. 6 is an enlarged fragmental side view interlocking one clip with an adjacent clip; and Fig. 7 is an enlarged side view of adjoining end portions of a pair of interlocked clips.

Referring to the drawing, one typical installation embodying the invention comprises a supporting part 1, which may be a structural part of an aircraft, motor vehicle or the like, and which is preferably provided with a longitudinal row of equally spaced apertures 2.

The fabric 4 which is to be secured in place upon the support may comprise one or more plies of flexible material, which may be woven fabric or suitable sheet material such as leather, felt, sheeting or the like, and this fabric 4 overlies the apertured support 1. The fabric material 4 is conveniently secured to the support by a connected series of fastener elements or clips 3 each having an elongated material-engaging portion 5, a support-engaging fastener portion 6 passed through the fabric and lockingly engaging the under face of the support, and a locking portion 7 for engagement with the support-engaging fastener portion of an adjacent clip whereby a series of clips may be connected in series to provide a continuous fastening or stitching of desired length as illustrated in Fig. 2.

The invention provides a novel form of fastener or attaching clip for use in an installation as above described and aims particularly to provide one that is simple in construction, cheap in the cost of manufacture as well as one which may be heat-treated for stiffness to provide a secure fastening.

Referring particularly to Figs. 4 to 7 inclusive, the invention provides a fastener clip having an elongated material-engaging portion 5 formed of thin flat strip material, such as ribbon steel, the portion 5 being adapted to overlie the outer face of the fabric. The support-engaging fastener portion 6 on one end of the portion 5 is advantageously, though not necessarily formed of the same type and size of material as the portion 5. Preferably it is a loop-type fastener having an open upper end, as at 8 and conveniently may be V-shaped to provide an open throat 8 at an entering nose 9. The side walls 10 of the support-engaging fastener member 6 are advantageously formed of the same material as the portion 5 and preferably diverge from the nose end 9 to the plane of the portion 5, the side walls 10 being connected to the material-engaging portion 5 and the terminal end 11 of the clip by inwardly directed neck portion 12, presenting shoulders 13 on the fastener portion 6 for locking engagement with the aperture walls of the support 1. Thus the fastener portion 6 may be forced through the fabric 4 and into the apertures 2 of the support, so that the shoulders 13 will engage the support with a snap fastener action.

The locking element 7 on the opposite end of the material-engaging portion 5 advantageously is of less length than the depth of the fastener loop portion 6 and preferably extends angularly from the portion 5 on the same side thereof as the support-engaging fastener portion 6, and may be in the form of a tongue connected to the portion 5 by a bight or rounded head 14, so as to overlie the terminal end 11 of an adjacent clip whereby the material-engaging portions 5 of a series of clips will be disposed in a common plane, all holding the fabric against the support.

The locking element 7 is disposed at some angular position, to the portion 5, different from either of the sides 10 of the support-engaging fastener portion 6, and preferably this angular relation is at least 90 degrees and advantageously greater so as to include an obtuse angle between them. The inner portion of the rounded head 14 provides a locking seat 15 for locking engagement with the aperture wall of the support 1, so that the terminal end of a series of clips will be securely locked to the support.

In affixing the attaching clips to the fabric 4 and support 1, the locking tongue 7 of an initially applied clip is forced through the fabric and an aperture 2 of the support, where the seat 15 locks against the aperture wall of the support. The support-engaging fastener portion 6 of the initially applied clip is then forced through the fabric and through the next aperture 2, so that the shoulders 13 seat under the support 1.

The next adjacent fastener is similarly applied by inserting the locking tongue end 7 down through the open throat 8 of the previously affixed support-engaging fastener member 6, as illustrated in Fig. 6. As the second clip is moved to locked position, the tongue engages the opposite divergent sides of the fastener portion 6 expanding them and maintaining them in locked engagement with the support as illustrated in Fig. 7. The bight or rounded head 14 provides a seat for the terminal end 11 of the previously applied clip (Fig. 7) so that the material-engaging portions 5 lie in a common plane to tightly hold the fabric against the support.

Thus the series of interconnected fasteners provides a continuous line fastening for the flexible fabric strip which is of material advantage in installations of the type above described.

Although I have illustrated and described only a single form of my invention, it is to be understood that the invention is not restricted thereby, as the scope of the invention is best defined by the following claims.

I claim:

1. A sheet metal clip adapted for securing a covering to an underlying support formed with a row of apertures, said clip comprising a thin strip of metal formed at one end with a shouldered tapered loop fastener portion adapted for snap-fastening engagement with an aperture wall of a support, the opposite end of said strip being formed with a locking tongue of less length than the depth of the loop portion and adapted to be inserted into the loop fastener portion of an adjacent previously positioned clip for engaging and expanding the sides of a previously positioned loop fastener portion against removal from a support.

2. A sheet metal clip for securing fabric to an underlying support formed with a row of apertures, said clip comprising a thin strip of metal formed at one end with a shouldered loop fastener portion adapted for snap fastener engagement with an apertured wall of a support, the opposite end of said strip formed with a rounded head and an angularly extending tongue adapted to be positioned wholly within and expand the opposed sides of a terminal loop fastener portion of the adjacent clip.

3. A sheet metal clip for securing fabric and the like to an underlying apertured support provided with a row of apertures therein, said clip comprising an elongated body of thin strip metal formed at one end with a V-shaped fastener portion adapted for insertion in an apertured support, the opposite end of said body being formed with an angularly disposed resilient locking element for engaging and expanding the opposed sides of a terminal V-shaped fastener part of an adjoining clip.

4. A sheet metal clip for securing fabric and the like to an underlying apertured support provided with a row of apertures therein, said clip comprising an elongated body of thin strip metal formed at one end with a V-shaped fastener portion adapted to be forced through a fabric and positioned in an aperture of a support, the opposite end of said body being formed with an angularly disposed locking element, the upper end of said V-shaped fastener portion being reduced and open to axially receive and place under tension the locking element of an adjacent clip whereby a plurality of clips may be connected in series to form a continuous fastening of desired length.

5. A sheet metal clip for securing fabric and the like to an underlying apertured support provided with a row of apertures therein, said clip comprising an elongated body of thin strip metal formed at one end with a loop fastener portion adapted to be forced through a fabric and positioned in an aperture of a support, the opposite end of said body being formed with an angularly disposed locking element of less length than the depth of the loop portion, the upper end of said loop-fastener portion being restricted and open to receive axially a locking element of an adjacent clip to prevent contraction of said loop fastener portion.

6. A fastener clip for securing material to an apertured support comprising an elongated material-engaging portion formed of relatively stiff strip material, an open-topped support-engaging fastener portion extending angularly from one end of said material-engaging portion and adapted for snap fastener engagement with a support aperture, and a locking element on the opposite end of said material-engaging portion and disposed on the same side thereof as said support-engaging fastener portion for interlocking snap fastener engagement through the open top of the support-engaging fastener portion of an adjacent clip whereby a plurality of clips may be connected together to form a continuous fastening of desired length, said locking element bearing on an inner face of said support-engaging fastener portion under tension to prevent contraction thereof and removal from an apertured support in which it may be inserted.

7. A series of fastener clips of like construction adapted to be connected in end-to-end relation by a snap fastener action to form a continuous length of metallic stitching for securing a covering to a support having a row of spaced fastener-receiving apertures, each of said fastener clips comprising an elongated body of thin strip metal formed adjacent one end with an angularly disposed V-shaped loop fastener portion having an open restricted throat at one end, the opposite end of said body having a locking tongue disposed at an obtuse angle to the body and connected thereto by an arcuate head portion, said locking element being insertable axially through the open restricted end of a V-shaped loop fastener portion of an adjacent clip with the arcuate head portion overlying one side of the restricted open throat and the locking tongue engaging under tension an opposite tapered wall of said loop fastener portion to prevent contraction of said loop fastener portion and removal thereof when positioned in an apertured support.

WILMER H. CHURCHILL.